April 28, 1970 E. F. WAHL Re. 26,869

DISPERSION PROCESS

Original Filed June 3, 1964

INVENTOR.
EDWARD F. WAHL
BY Chisholm and Spencer
ATTORNEYS

United States Patent Office

Re. 26,869
Reissued April 28, 1970

26,869
DISPERSION PROCESS

Edward F. Wahl, Lakewood, Ohio, assignor to PPG Industries, Inc., a corporation of Pennsylvania Original No. 3,337,140, dated Aug. 22, 1967, Ser. No. 372,267, June 3, 1964. Application for reissue Aug. 14, 1968, Ser. No. 786,505
Int. Cl. B02c *17/16*
U.S. Cl. 241—21 6 Claims

Matter enclosed in heavy brackets [ ] appears in the original patent but forms no part of this reissue specification; matter printed in italics indicates the additions made by reissue.

*ABSTRACT OF THE DISCLOSURE*

*Solid particles in a liquid media are reduced by feeding them vertically through a dispersion mill containing grinding pellets made up of partially or fully stabilized zirconium oxide particles bound together by an organic or inorganic binder. Movement of the pellets caused by rotation of a central impeller in the mill acts to grind the solid particles.*

This invention relates to a novel process for dispersing or reducing the size of solid particles contained in a liquid media. The invention has particular application to the dispersing and size reduction of pigments in a film-forming vehicle.

Prior processes for dispersing of solids or reducing the size of solids in a liquid media have involved the use of ball mills, pebble mills, rod mills, attritors and the like. In U.S. Patent 2,581,414, there is disclosed a more recent process for dispersing pigments in a liquid vehicle wherein the process comprises a vertical mill containing sand of 20 to 40 mesh. While the sand mill disclosed in U.S. Patent 2,581,414, has certain advantages over the ball mills and the like previously used for pigment dispersion, certain pigmentary particles cannot be properly dispersed in a sand mill of that type; therefore, a manufacturer of a broad line of pigmentary materials dispersed in film-forming vehicles had to maintain on hand a certain number of ball mills, pebble mills or the like in which to grind those pigments which could not be handled in a sand mill.

However, it has now been discovered that a mill utilizing as grinding media a solid particle containing Group IV–B metal having a molecular weight greater than 90 is an improvement over the ball mills and sand mills presently used in the art. Unlike silica sand, such Group IV–B metal particles, e.g., hafnium oxide and zirconium oxide, are useful in a wide range of sizes.

Zirconium containing particles particularly useful in this mill contain about 40 percent or more by weight of zirconium and have a particle size of about 5 millimeters or more to about 0.05 millimeter or less and preferably from about 3 millimeters to about 0.25 millimeter. The zirconium particle may be zirconium silicate, zirconium oxide, particularly zirconium dioxide, or similar zirconium compounds having abrasion and impact resistance. The preferred zirconium containing particle is a partially stabilized or fully stabilized zirconia (zirconium oxide) having excellent abrasion resistance and containing about 90 percent or more zirconium oxide. Stabilized zirconia has a cubic crystal structure and has excellent abrasion resistance. The partially stabilized zirconia is a homogeneous reaction mixture of monoclinic crystals and cubic crystals, generally comprising about equal proportions of each.

Stabilized zirconia, i.e., zirconia having a cubic crystalline structure, is produced by heating zirconia having a monoclinic crystalline structure to about 2500° F. with about 5 percent by weight of calcium oxide or magnesium oxide. The partially stabilized zirconia is produced when less than 5 percent by weight of calcium or magnesium oxide is utilized. A typical process for producing stabilized zirconia is described in U.S. Patent 2,721,115.

A wide range of particle sizes of the partially stabilized or fully stabilized zirconia can be provided by sintering to cause agglomeration of small particles and then grinding to obtain the correct particle size. Also, fine particles can be pelletized to an appropriate size by utilizing a strong organic or inorganic binder.

It has been discovered that the instant invention is advantageous over both the ball milling processes and the prior sand milling processes in that it gives a greater throughput of material than either of the prior processes and has the capability of grinding pigmentary particles which cannot be satisfactorily ground in a sand mill. The process involves passing a liquid which contains solid particles to be deagglomerated or reduced in size, through a cylindrical or similarly shaped enclosure containing a mass of zirconium particles as defined hereinabove; the preferred size of the particles being from about 0.3 millimeter to about 2 millimeters in diameter. The mass of zirconium particles is agitated, for example, by an impeller or similar means. The liquid-solid mixture is generally fed into the bottom of the mass of zirconium particles and removed from the top of said mass.

In order to more clearly describe the instant invention, reference is made to the accompanying drawing which illustrates embodiments of apparatus suitable for carrying out this invention.

Figure 1:
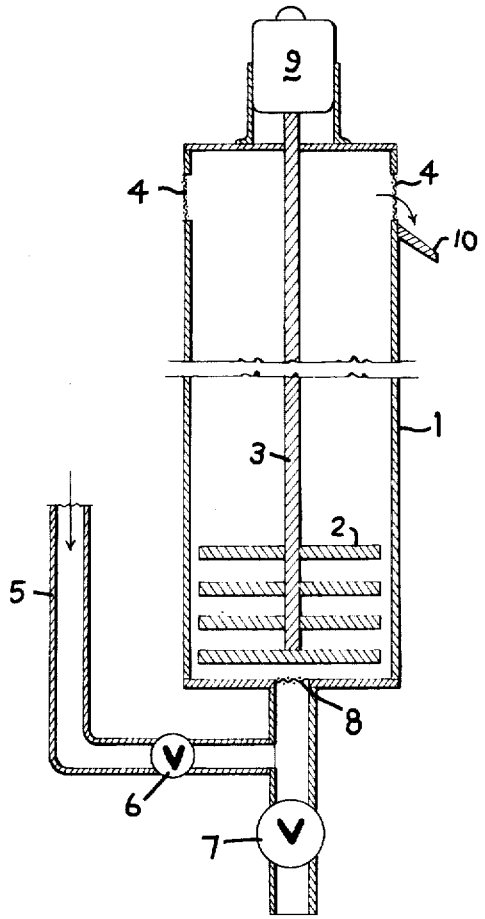
FIGURE 1 is a vertical sectional view of a simple and efficient apparatus useful primarily for continuous operation, although adapted for intermittent or batchwise use.

Referring to FIGURE 1, the apparatus comprises an open topped, cylindrical vessel 1, having a motor 9 driven agitator shaft 3 suspended vertically along its axis. The shaft is provided with one or more impellers 2 of any desired shape, such as the impellers depicted in FIGURES 2 and 3, although propellers, paddles, blades and the like may be utilized.

The pigment dispersion to be ground enters the apparatus through line 5 when the apparatus is operated continuously, moving upwardly through the cylinder and exiting the apparatus through screens 4 and trough 10 at the top of the cylinder. The apparatus may be operated batchwise by closing valve 6 and introducing the dispersion containing pigment into the top of the apparatus and subsequently discharging the processed material through the screen 8 at the bottom and the discharge valve 7. The apparatus as depicted in FIGURE 1 may be jacketed to provide cooling as the process tends to create heat in reducing the size of the pigmentary particles.

While FIGURE 1 depicts the grinding apparatus in a vertical position, this has been done for illustrative purposes only as mills containing zirconium containing particles may be operated in any conventional manner by making minor mechanical changes to the apparatus.

Figure 2:
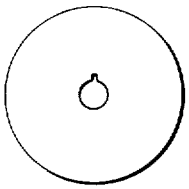
FIGURES 2 and 3 are top views of typical impellers used in the dispersing apparatus depicted in FIGURE 1.

FIGURE 2 depicts an impeller of a flat, solid disk having a concentric hole which may be keyed to provide positive drive when the disk is attached to the agitator shaft 3 of the apparatus illustrated in FIGURE 1.

Figure 3:
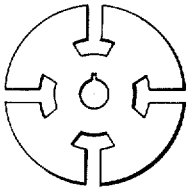

FIGURE 3 illustrates another type of impeller which may be successfully utilized in the apparatus of FIGURE 1. This impeller has slots cut in the perimeter of the impeller long a radial line. The slots in the impeller permit the pigment containing dispersion to pass upwardly through the impeller as well as travelling about its periphery.

The materials of construction are preferably steel, although the equipment may be constructed of aluminum or other suitable metal and where extreme purity is demanded, the apparatus may be constructed of glass or other suitable material.

The process of the instant invention is useful for grinding and dispersing particles in practically any type of a liquid-solid system. The instant invention has particular application to the grinding and dispersing of pigments in film-forming vehicles. An admixture of pigment and vehicle may be processed in the instant invention by passing the slurry of pigment and vehicle through a mass of zirconium containing particles contained in an apparatus similar to that depicted in FIGURE 1 while rapidly moving the zirconium containing particles in relation to one another. This, of course, may be done by utilizing an agitator drive shaft such as that shown in FIGURE 1 although the zirconium containing particles may be moved with reference to one another by agitating the whole cylinder containing said grinding particles or by circulating the pigment liquid dispersion very rapidly through a mass of zirconium containing particles. In an apparatus similar to that depicted in FIGURE 1, the proper ratio of zirconium containing particles to pigment-vehicle slurry by volume has been determined to be about 25 percent to 70 percent zirconium containing particles to about 75 percent to 30 percent slurry.

The following examples illustrate in detail the novel apsects of the instant invention. The examples are not intended to limit the invention, however, for there are, of course, numerous possible variations and modifications.

In the following examples a vertical mill of the type illustrated in FIGURE 1 having a volume capacity of about three gallons was utilized. The agitator shaft was driven at speeds varying about 1500 r.p.m. to about 2250 r.p.m. The mill was filled with about 1½ gallons of zirconium containing particles. Both solid disks and slotted impellers of the type illustrated respectively in FIGURES 2 and 3 were utilized.

EXAMPLE I

Alkyd resin enamel

A long oil linseed alkyd paste having a viscosity of 3900 centipoises was processed in the following manner.

| | Parts |
|---|---|
| Pigment content | 53.7 |
| Vehicle content | 46.3 |

The vehicle comprised 6.3 percent by weight of a long oil linseed alkyd and about 93 percent solvent with a small amount of extenders, wetting agents and the like. The pigment composition was a mixture of molacco black, zinc chromate, talc and barytes. The pigment paste had an initial Hegman reading before grinding of 0. This is equivalent to about .004 inch or greater. The paste was passed through a bed of partially stabilized zirconia having a size range of 14 to 28 mesh at a flow rate of about 10.6 gallons per hour. The Hegman reading on the ground paste was 7+ indicating that the pigment particles were now less than .0005 inch in diameter. Thus, a size reduction of about tenfold was accomplished at a flow rate of about 10.6 gallons per hour.

This same paste composition was processed through a silica sand mill of the same volume but of the type illustrated in U.S. Patent 2,581,414 and containing sand of 20 to 40 mesh. At a flow rate of 8 gallons per hour, a final Hegman reading of 5½ was obtained. This is equivalent to about .0012 inch. Thus, through a conventional sand mill at a flow rate of 8 gallons per hour, the pigment in the paste was reduced in size only about fourfold.

In a conventional ball mill the grinding time for a paste to achieve a final grind of 7+ on the Hegman scale requires about 15 hours.

This paste was processed at various times through mills utilizing both the solid disk impeller and the slotted impellers. Comparable results were obtained in each instance.

EXAMPLE II

Alkyd resin enamel

A medium length oil soya alkyd paste having a viscosity of 1500 centipoises was processed in the following manner.

| | Parts |
|---|---|
| Pigment content | 39.0 |
| Vehicle content | 61.0 |

The vehicle comprised about 24.0 percent by weight of a medium length oil soya alkyd and about 76 percent by weight of solvent. The pigment composition was a mixture of molybdate orange, lithol red, and titanium dioxide. The slurry was processed at a flow rate of about 8 gallons per hour through a bed of partially stabilized zirconia of 14 to 28 mesh. The finished product had a Hegman reading of 7+, that is, a pigment particle diameter of less than .0005 inch.

The same paste cannot be successfully ground in a silica sand mill and requires about 40 hours of grinding in a conventional ball mill to achieve a comparable finished product.

EXAMPLE III

Acrylic coating composition

An acrylic coating composition having a viscosity of 10 centipoises was produced in the following manner.

| | Parts |
|---|---|
| Pigment content | 14.3 |
| Vehicle content | 85.7 |

The vehicle comprised about 14.3 percent by weight of an acrylic interpolymer and about 85.7 parts by weight of solvent. The pigment was thio red.

The initial pigment size was in excess of .004 inch. The paste was processed at a flow rate of 9.7 gallons per minute through a bed of partially stabilized zirconia of 16 to 20 mesh. A Hegman reading of 7½ was obtained on the finished product, which is equivalent to a particle size of about .00025 inch; indicating a size reduction of about fifteen fold.

The same composition processed on a silica sand mill had a flow rate of 8 gallons per hour and had a final Hegman reading of only 6½. This is equivalent to a particle diameter of about .0007 inch or a size reduction of only about sixfold.

EXAMPLE IV

Acrylic coating composition

An acrylic coating composition having a viscosity of 110 centipoises was produced in the following manner.

| | Parts |
|---|---|
| Pigment content | 12.2 |
| Vehicle content | 87.8 |

The vehicle comprised about 20.4 percent of an acrylic interpolymer and about 79 percent solvent. The pigment was thio red.

The composition was processed through a partially stabilized zirconia media of 14 to 28 mesh at a flow rate of 11.8 gallons per hour. The processed material had a pigment size of about .00012 inch, that is, a Hegman reading of 7¾. The initial pigment size had been about .004-inch; thus, a size reduction of about twenty-five fold was accomplished.

This same composition when processed through a silica sand media of 20 to 40 mesh under comparable conditions at a flow rate of 8 gallons per hour, yielded a product having a Hegman reading of 5½, which is about .0012 inch pigment size, or a size reduction of only about 2½.

EXAMPLE V

Acrylic coating composition

An acrylic coating composition having a viscosity of 200 centipoises was processed in the following manner.

| | Parts |
|---|---|
| Pigment content | 48.0 |
| Vehicle content | 52.0 |

The vehicle comprised about 20.4 percent by weight of an acrylic interpolymer and about 79 percent by weight of solvent. The pigment was titanium dioxide.

The paste was processed through a partially stabilized zirconia media of about 14 to 28 mesh at a flow rate of 27 gallons per hour. The pigment size of the processed material was about .0025 inch, that is, a Hegman reading of about 7½.

When the same composition was processed through a silica sand media at a flow rate of 15.6 gallons per hour, a pigment size of .00025 inch was also obtained.

EXAMPLE VI

Acrylic coating composition

An acrylic coating composition having a viscosity of 900 centipoises was processed in the following manner.

| | Parts |
|---|---|
| Pigment content | 8.8 |
| Vehicle content | 91.2 |

The vehicle comprised about 15.5 percent by weight of of an acrylic interpolymer and about 84 percent of a solvent. The pigment was monastral blue.

The composition was processed through a mill containing stabilized zirconia particles of 14 to 28 mesh range at a flow rate of about 24 gallons per hour. The processed material had a particle size of less than about .00012 inch, that is, a Hegman reading of 7¾.

To achieve the same degree of grind in a sand mill containing silica sand of 20 to 40 mesh, the throughput had to be maintained at only 5 gallons per hour.

EXAMPLE VII

Alkyd coating composition

A short oil linseed alkyd coating composition having a viscosity of 800 centipoises was processed in the following manner.

| | Parts |
|---|---|
| Pigment content | 29.0 |
| Vehicle content | 71.0 |

The vehicle comprised about 35.6 percent by weight of a short oil linseed alkyd and about 64.4 percent by weight of a solvent. The pigment in this instance was talc.

The pigment dispersion was processed through a stabilized zirconia media having a particle range of 14 to 28 mesh at a throughput of 25 gallons per hour. The Hegman reading on the processed material was 5+ indicating a pigment diameter of about .0015 inch.

To achieve the same size pigment diameter by processing through a silica sand mill containing sand of 20 to 40 mesh, the throughput had to be maintained at only 11 gallons per hour.

EXAMPLE VIII

Acrylic coating composition

An acrylic coating composition having a viscosity of 500 centipoises was processed in the following manner.

| | Parts |
|---|---|
| Pigment content | 5.3 |
| Vehicle content | 94.7 |

The acrylic vehicle comprised about 19 percent by weight of an acrylic interpolymer and about 81 percent by weight of a solvent. The pigment in this example was carbon black.

The composition was processed through a bed of stabilized zirconia media having a mesh size of 16 to 20 mesh at a flow rate of 26 gallons per hour. The processed composition had a pigment size of about .001 inch.

The scope of this invention is not to be restricted to the dispersed pigments or the dispersion vehicles set forth in the foregoing examples. The invention may readily be used in any instances in which dispersed particles are to be reduced in size, for example, in the grinding of clay slips wherein clay is dispersed in water and is conventionally ground in ball mills.

Of course, this invention is especially useful where pigments are to be dispersed in a film-forming material. The film-forming material may be any of the conventional drying, semidrying, or nondrying oil vehicles containing natural and synthetic resins and/or modified resins, cellulosic materials and emulsions of these substances.

The pigments may be any of the conventional pigments used to promote hiding and/or color in coating compositions. The white pigments, such as titanium dioxide, basic lead carbonate, talc and the like, colored pigments of various types either organic or inorganic and the like are readily deagglomerated or reduced in size.

The viscosity of the dispersion to the process can vary considerably. The process of this invention can be successfully utilized with dispersions having a viscosity of about 5 centipoises or less to about 10,000 centipoises or more.

The invention described herein is exceptionally useful in that it is more versatile than any of the prior art processes. It grinds materials much more rapidly than does ball mill apparatus, and it is capable of grinding pigmentary materials which cannot be satisfactorily ground on a silica sand mill. This is exceptionally advantageous in that this process diminishes the need for numerous types of equipment in a manufacturing plant. It is further advantageous in that its great efficiency allows the use of smaller amounts of pigments in coating compositions inasmuch as hiding power and tinting strength are increased as the particle size is decreased.

While specific examples of the invention have been set forth hereinabove, it is not intended to limit the invention solely thereto, but to include all of the variations and modifications thereof which are within the scope of the appended claims.

I claim:

1. A process for reducing the size of solid particles dispersed in a liquid media, which comprises agitating said solid particles and liquid media with a mass of zirconium oxide pellets *having a particle size within the range of about 3 millimeters to 0.25 millimeter, and being* composed predominantly of a member of the class consisting of partially stabilized zirconium oxide particles and fully stabilized zirconium oxide particles bound together in pellet form with a member of the class consisting of inorganic binders and organic binders, and separating said pellets from the liquid solid dispersion.

2. The process of claim 1 wherein the zirconium oxide utilized is partially stabilized.

3. The process of claim 1 wherein the zirconium oxide utilized is fully stabilized.

4. A continuous process for reducing the size of solid particles dispersed in a liquid film-forming vehicle, which comprises agitating the pigmentary particles and film-forming vehicle with a mass of zirconium oxide pellets *having a particle size within the range of about 3 millimeters to 0.25 millimeter, and being* composed predominantly of a member of the class consisting of partially stabilized zirconium oxide particles and fully stabilized zirconium oxide particles bound together in pellet form with a member of the class consisting of inorganic binders and organic binders, continuously separating the dispersion of pigmentary particles and film-forming vehicle from the zirconium oxide pellets and contiuously introducing additional pigmentary particles and liquid film-forming vehicle to replace that removed.

5. The process of claim 4 wherein the zirconium oxide utilized is partially stabilized.

6. The process of claim 4 wherein the zirconium oxide utilized is fully stabilized.

References Cited

The following references, cited by the Examiner, are of record in the patented file of this patent or the original patent.

UNITED STATES PATENTS

| | | | |
|---|---|---|---|
| 2,204,582 | 6/1940 | Donahue | 241—184 X |
| 2,212,641 | 8/1940 | Hucks | 241—30 X |
| 2,489,307 | 11/1949 | Miller | 51—309 |
| 3,055,600 | 9/1962 | Barkman | 241—172 |
| 3,172,609 | 3/1965 | Olsen | 241—172 X |

ROBERT C. RIORDON, Primary Examiner

D. G. KELLY, Assistant Examiner

U.S. Cl. X.R.

241—30, 184